(12) United States Patent
Yang et al.

(10) Patent No.: US 8,199,286 B2
(45) Date of Patent: Jun. 12, 2012

(54) POLYMER STABILIZED ELECTRICALLY CONTROLLED BIREFRINGENCE TRANSFLECTIVE LCD

(75) Inventors: Deng-Ke Yang, Hudson, OH (US); Fushan Zhou, Kent, OH (US)

(73) Assignee: Kent State University, Kent, OH (US)

( * ) Notice: Subject to any disclaimer, the term of this patent is extended or adjusted under 35 U.S.C. 154(b) by 1682 days.

(21) Appl. No.: 11/193,717

(22) Filed: Jul. 29, 2005

(65) Prior Publication Data

US 2006/0023146 A1   Feb. 2, 2006

Related U.S. Application Data

(60) Provisional application No. 60/592,316, filed on Jul. 29, 2004.

(51) Int. Cl.
    *G02F 1/1335* (2006.01)
(52) U.S. Cl. .......................................... 349/114; 349/82
(58) Field of Classification Search .................. None
    See application file for complete search history.

(56) References Cited

U.S. PATENT DOCUMENTS

| | | | | |
|---|---|---|---|---|
| 4,068,923 A * | 1/1978 | Toida | ............................. | 349/132 |
| 4,093,356 A * | 6/1978 | Bigelow | ........................ | 349/114 |
| 5,240,636 A * | 8/1993 | Doane et al. | ............. | 252/299.01 |
| 5,384,067 A * | 1/1995 | Doane et al. | ................... | 349/183 |
| 5,990,995 A * | 11/1999 | Ebihara et al. | ................. | 349/113 |
| 6,930,736 B2 * | 8/2005 | Tashiro et al. | ................... | 349/86 |
| 7,015,997 B2 * | 3/2006 | Choi et al. | ..................... | 349/114 |
| 7,301,601 B2 * | 11/2007 | Lin et al. | ........................ | 349/201 |
| 2001/0055082 A1 * | 12/2001 | Kubo et al. | ..................... | 349/114 |
| 2002/0180914 A1 * | 12/2002 | Wu et al. | ........................ | 349/115 |
| 2003/0086044 A1 * | 5/2003 | Inoue et al. | ..................... | 349/141 |
| 2003/0231268 A1 * | 12/2003 | Chen et al. | ..................... | 349/113 |
| 2004/0090576 A1 * | 5/2004 | Chuang | ......................... | 349/114 |
| 2005/0083460 A1 * | 4/2005 | Hattori et al. | ................. | 349/114 |

OTHER PUBLICATIONS

Makoto Yoneya et al., "Depolarized Light Scattering from Liquid Crystals as a Factor for Black Level Light Leakage in Liquid-Crystal Displays," Journal of Applied Physics 98, 016106 (2005), 3 pages, downloaded Nov. 16, 2010 to 131.123.235.2.

* cited by examiner

*Primary Examiner* — Lucy Chien
(74) *Attorney, Agent, or Firm* — Fay Sharpe LLP (57) ABSTRACT

A transreflective display in which the thickness of the liquid crystal layer is the same for both transmissive and reflective modes. The transmissive and reflective pixels are stabilized in two different liquid crystal configurations with different birefringences. The light retardation effect of one path in the transmissive pixels is close to or equals the retardation effect of two paths in the reflective pixels, resulting in synchronization of the two modes.

15 Claims, 7 Drawing Sheets

POLYMER STABILIZED ELECTRICALLY CONTROLLED BIREFRINGENCE TRANSFLECTIVE LCD

This application claims benefit of the filing date of and priority from U.S. provisional application Ser. No. 60/592,316 filed on Jul. 29, 2004.

BACKGROUND

The present exemplary embodiments relate to liquid crystal displays. It finds particular application in conjunction with polymer stabilized transflective liquid crystal displays, and will be described with particular reference thereto. However, it is to be appreciated that the present exemplary embodiments are also amenable to other like applications.

Liquid crystal displays (LCD's) can be described as being one of three basic types: transmissive, reflective or transflective. In transmissive construction, all of the light seen by the user is transmitted through the LCD from a backlight. Typically, the LCD pixels are illuminated from behind the display using a cold cathode fluorescent lamp (CCFL) or LED.

Transmissive LCDs offer wide color gamut, high contrast and are typically used in laptop personal computers. Transmissive LCDs offer the best performance under lighting conditions varying from complete darkness to an office environment. In very bright outdoor environments they tend to "wash out" and become unreadable due to the reflection of the sun from the surface of the LCD overwhelming the light being transmitted through the display.

In reflective LCDs, the pixels are illuminated from the front. Reflective LCD pixels reflect incident light originating from the ambient environment or from a frontlight using a mirror layer situated behind the LCD. Reflective LCDs consume very low power (especially without a front light) and are often used in small portable devices such as handheld games, PDA's or other portable instrumentation. Reflective LCDs offer good performance under lighting conditions typical of office environments and brighter. Under dim lighting conditions, reflective LCDs become more difficult to read due to the absence of a strong light source to illuminate the pixels.

Transflective LCDs combine the characteristics of both transmissive and reflective displays. The pixels in a transflective display are partially transmitting and are illuminated by a backlight. The use of a partially reflective mirror also renders the pixels partially reflective, so under ambient illumination they also reflect light from the environment. Transflective LCDs are often used in devices that will be used under a wide variety of lighting conditions (from complete darkness to full sunlight). Under dim lighting conditions transflective LCDs offer visual performance similar to transmissive LCDs, while under bright lighting conditions they offer visual performance similar to reflective LCDs.

A transreflective display can be operated in two modes: reflective mode, in which ambient light is reflected from the display, and transmissive mode, in which light from the backlight passes through the liquid crystal and emitted from the display. It is desired that the operations of the reflective mode and transmissive mode be synchronized, that is, in one voltage condition, both modes are in black state and in another voltage condition, both mode are in bright state. In any other arrangement, the two modes will interfere with each other, resulting in a low contrast ratio.

In the transmissive mode, the light passes through the liquid crystal layer only once (from the back to the front) while in the reflective mode, the light passes through the liquid crystal twice (from the front to the back, where it is reflected by a mirror, and then from the back to the front). This feature of different optical paths of the two modes makes it difficult to synchronize their operation. In a state-of-art transreflective display, the transmissive and reflective modes are operated using two different types of pixels.

Figure 1:
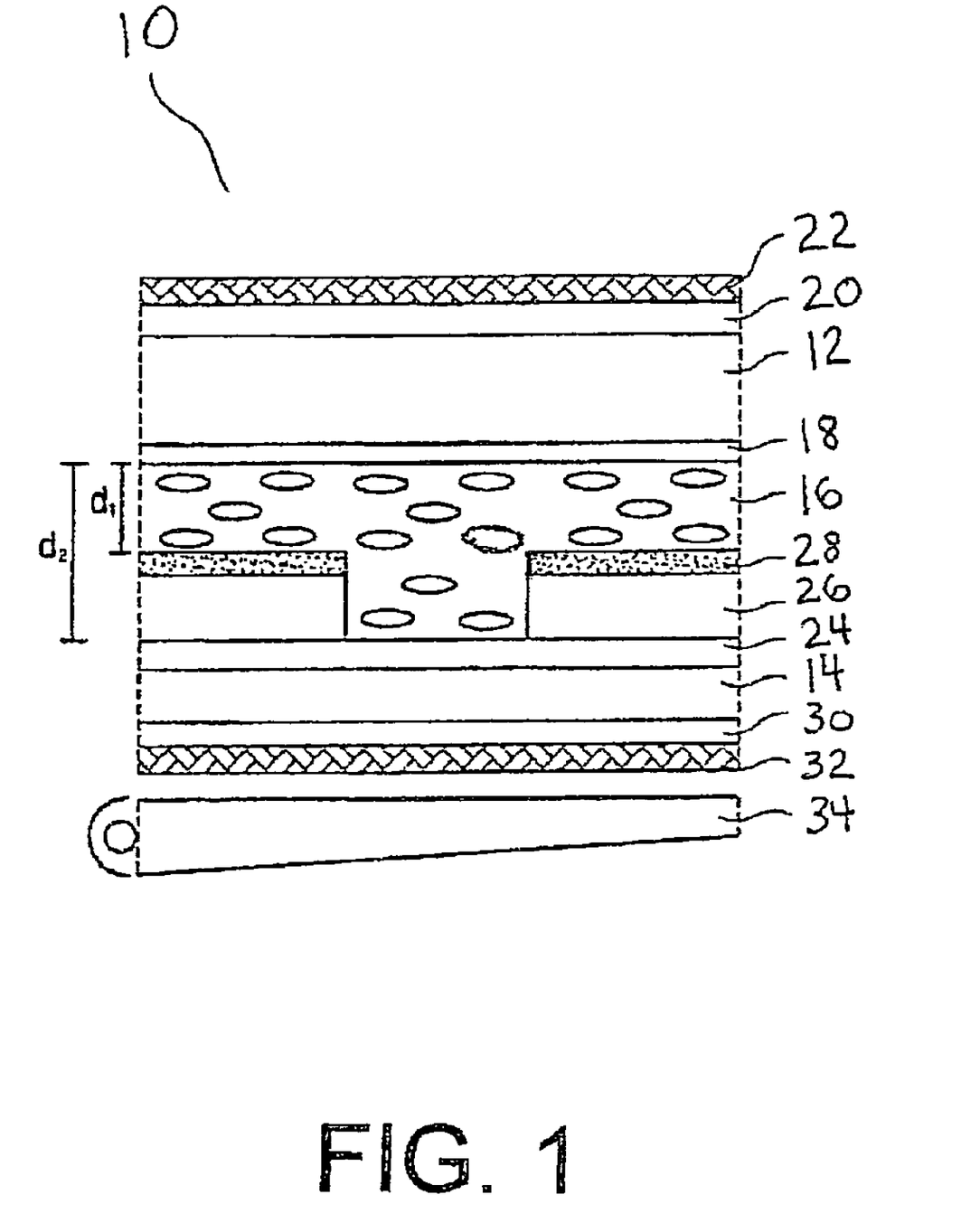
FIG. 1 is a cross-sectional view of a conventional transflective LCD.

FIG. 1 shows a typical transflective LCD device 10. The transflective LCD includes upper and lower substrates 12, 14 with an interposed liquid crystal 16. The upper and lower substrates may alternately be referred to as a color filter substrate and an array substrate. The upper substrate 12 includes a common electrode 18 on its surface adjacent the liquid crystal 16. On the other surface of the upper substrate 12, a retardation film 20 and an upper polarizer 22 are formed.

The lower substrate 14 includes a transparent electrode 24 on its surface adjacent the liquid crystal 16. A passivation layer 26 and a patterned mirror electrode 28 are formed in series on the transparent electrode 24. The patterned mirror 28 and the transparent electrode 24 act together as a pixel electrode. The passivation layer 26 and the patterned mirror electrode 28 have a plurality of transmitting holes 30. On the opposite surface of the lower substrate 14, a lower retardation film 30 and a lower polarizer 32 are formed. A backlight device 34 is arranged below the lower polarizer 32.

In order to form a pixel electrode, a transparent conductive material such as ITO (indium tin oxide) or IZO (indium zinc oxide) is deposited on the lower substrate 14 and then patterned into the transparent electrode 24.

Next, the passivation layer 26 is formed on the transparent electrode 24. A conductive metallic material having superior reflectivity, such as aluminum (Al) or the like, is deposited on the passivation layer 26 and then patterned to form a reflective patterned mirror electrode 28. In this patterning process, the transmitting holes 30 are formed in portions of the reflective patterned mirror electrode 28.

In this way, the transparent electrode 24 forms transmissive mode pixels at the transmitting holes while the patterned mirror electrodes 28 form reflective mode pixels. As discussed above, this structure results in different cell gaps "$d_1$" and "$d_2$" between the common electrode 18 and the pixel electrode (the reflective electrode 28 and the transparent electrode 24). "$d_1$" denotes the first cell gap between the common electrode 18 and the reflective electrode 28 while "$d_2$" denotes the second cell gap between the common electrode 18 and the transparent electrode 24.

The thickness of the liquid crystal layer in the transmissive mode pixels is twice as thick as the reflective mode pixels, as shown in FIG. 1. Therefore the retardation effect of the liquid crystal on the light is the same for the two modes. That is, since different pixel gaps (the transparent portion and the reflective portion) are formed in the liquid crystal layer, there is no difference in the optical retardation of light passing both through the transparent pixels and through the reflective pixels.

Although the operation of the two modes is synchronized in the display, it is a difficult process to fabricate alternating pixels with two thicknesses. Thus, it would be advantageous to develop a new transflective display in which the thickness of the liquid crystal layer is the same for both transmissive and reflective mode pixels.

Polymer stabilized liquid crystals (PSLC's) are generally prepared by dissolving and photopolymerizing monomers (typically less than 5 wt %) in a liquid crystals matrix to form a polymer network. The polymer used to form such networks is typically a UV curable polymer such as a diacrylate. Due to the advantages realized from PSLC's including improved device stability, it would be useful if they could be used to develop suitable transflective displays.

BRIEF DESCRIPTION

In accordance with one aspect of the present exemplary embodiment, there is provided a polymer stabilized liquid crystal display including a plurality of transmissive and reflective pixels, wherein the transmissive and reflective pixels are stabilized in different liquid crystal configurations with different birefringences.

In a second exemplary embodiment, there is provided a method for creating a polymer stabilized liquid crystal display, including the steps of providing a display cell including two parallel substrates and a plurality of transmissive and reflective pixels; filling the display cell with a mixture of liquid crystal, monomer and, optionally, a photo-initiator; subsequently, curing the monomer in one of the transmissive or reflective pixels while applying a voltage across them while the monomer in the other of the transmissive or reflective pixels is prevented from curing; and curing the monomer in the other of the transmissive or reflective pixels while applying a different voltage.

DETAILED DESCRIPTION

We developed a new transreflective display in which the thickness of the liquid crystal layer is the same for both transmissive and reflective modes. The transmissive and reflective pixels are stabilized in two different liquid crystal configurations with different birefringences. Thus, the optical retardation effect of one path length in the transmissive pixels is close to or equal the light retardation effect of two path lengths in the reflective pixels. Therefore the operation of the modes is synchronized.

The display utilizes a polymer stabilization technique in which a mixture of liquid crystal and monomer is used. The LC/monomer mixture is filled into the display cell, and the monomer is subsequently polymerized. As used herein, the term "monomer" is intended to include, unless otherwise specified, not only monomers but also other polymer precursors such as dimers, trimers, and etc. as well as low molecular weight oligomers.

Figure 2:
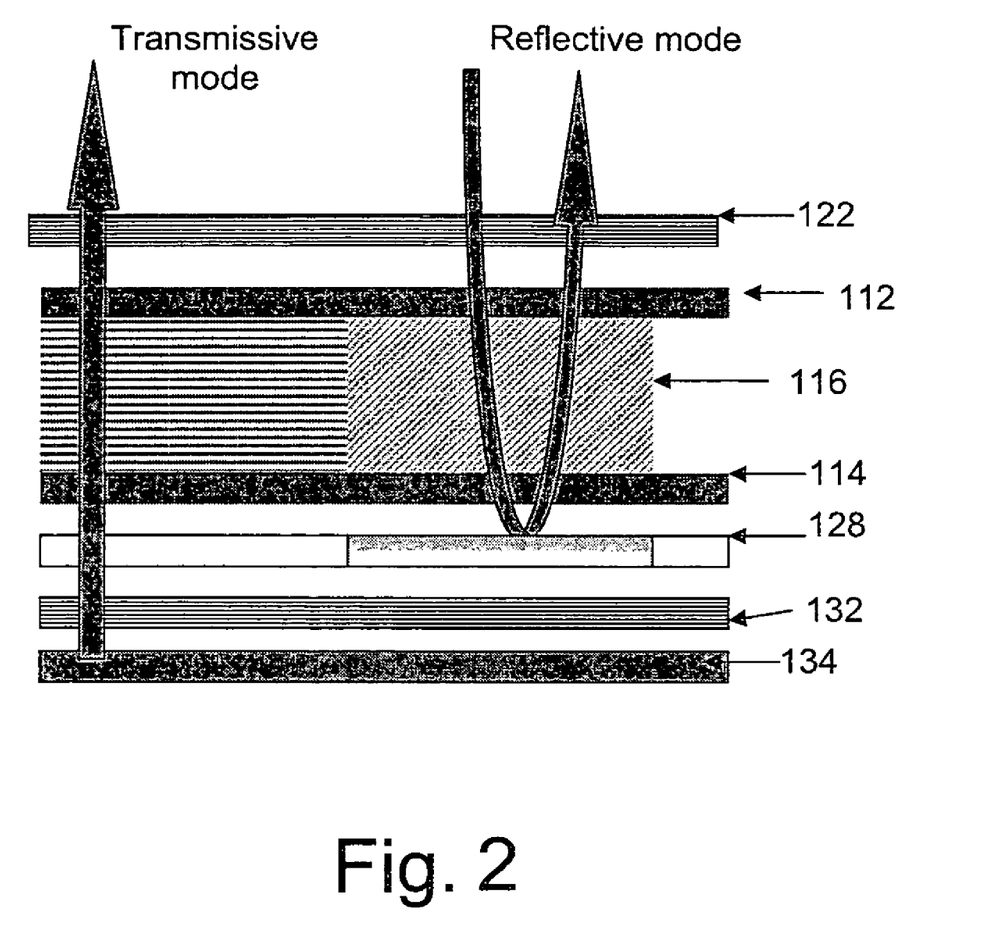
FIG. 2 is a cross-sectional view of a transflective LCD according to one embodiment.

Electric fields are applied across the liquid crystal layer during the polymerization. In the transmissive pixels, a low or zero field may be applied such that the polymer network formed stabilizes a liquid crystal configuration in which the liquid crystal is not tilted or only slightly tilted away from the substrate and thus can produce a large retardation effect, as shown in FIG. 2. In the reflective pixels, a high field is applied such that the polymer network formed stabilizes a liquid crystal configuration in which the liquid crystal is tilted to a greater extent from the substrate and thus produces a small retardation effect. The retardation effect in the transmissive pixels is about twice as that in the reflective pixels in a single path, and thus retardation effects on the light in the two modes are same and the operation of the modes are synchronized.

In one of the preferred embodiments of the present invention, a dual mode and haze-free liquid crystal film technology is provided that consists of dispersions of a mesogenic polymer network in a continuous liquid crystal matrix. This technology is referred to as polymer stabilized liquid crystals (PSLC's). The liquid crystal materials are usually organic in nature.

Any liquid crystal may be used in the present invention. Preferred liquid crystals include nematic liquid crystals. Although not intended to be limiting, typical organic classes of liquid crystal forming materials comprise both aromatic and aliphatic organic compounds such as benzylideneanilines, generally prepared from the reaction of para-substituted benzaldehyde and parasubstituted aniline; N-(p-alkoxybenzylidene)-p-amiostyrenes, prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted diphenylacetylenes; p,p'-disubstituted-1,4-diphenylbutadienes; p,p'-disubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

The polymer stabilizes the state of the liquid crystal in the absence of an applied field, and permits the liquid crystal to change states in the presence of an applied field. Suitable polymer materials may be selected from UV curable, thermoplastic and thermosetting polymers, including polymers formed from monomers having at least two polymerizable double bonds so as to be cross-linkable, polymethylmethacrylates, bisacrylates, hydroxyfunctionalized polymethacrylates and epoxy systems to name a few. The amount of polymer to be used depends upon the polymer. The polymer stabilizer is preferably derived from a polymerizable monomer that dissolves into and is aligned with the liquid crystal, and is preferably a UV curable (meth)acrylate, such as a diacrylate. Any other polymers suitable for use in polymer stabilized liquid crystal applications may also be used. Additional suitable polymers thus include, but are not limited to, epoxies as well as various other UV curable polymers.

The polymer content in terms of weight based on the combined weight of liquid crystal and polymer may vary depending upon, inter alia, the polymer and LC used, and in one embodiment may be present in an amount ranging from about 0.5 to about 30% by weight based on the combined weight of polymer and liquid crystal. It is to be understood, therefore, that the polymer content is subject to some variation, in as much as what constitutes a desirable or undesirable appearance of the cell in its various optical states is a matter of subjective judgment.

In carrying out the present embodiments, a solution of liquid crystal and polymer (or monomer precursor) is introduced into a cell. Polymerization is initiated in any suitable manner, as by UV radiation, microwave radiation, thermally etc., depending upon the polymer used. Under polymerization conditions, the polymer phase separates from the liquid crystal and forms phase separated polymer domains of polymer molecules.

In a first embodiment, shown in FIG. 2, there is provided a transflective display including upper and lower substrates 112, 114 coated with indium tin oxide (ITO) or some other conducting material to form an electrode. A polymer stabilized liquid crystal layer 116 is interposed between the two substrates. The substrates may be glass or any other suitable material. An upper polarizer 122 is formed on the top surface of the upper substrate and parallel to a lower polarizer (described below).

A patterned mirror electrode 128 is formed on the lower substrate 114. The patterned mirror 128 is reflective in the region of reflective pixels and transparent in the region of the transmissive pixels. These transparent regions may be thought of as transmitting holes for radiation emitted by a backlight 134. A lower polarizer 132 is formed between the patterned mirror and the backlight.

While not necessary to the invention, in some instances it is preferable to treat the cell walls to provide for surface alignment of the liquid crystal molecules parallel to the cell walls, e.g., by providing the cell walls with rubbed polyimide layers or treating them with detergent or chemicals. This has the effect of aligning the liquid crystal in the preferred direction.

The electrode layer to be used may be a conventional one, and some illustrative examples of the electrode layer include tin oxide film, indium oxide layer wherein tin oxide is mixed (ITO film), and thin films of metals such as gold and titanium, which are thin films having good conductivity. Among these electrodes, particularly preferred for the transparent electrode layer is ITO film.

The two substrates preferably have a form suitable for a continuous production process, such as a film or sheet. The transparent conductive film is typically formed by conventional prior art methods such as sputtering or by electron-beam vacuum deposition. Other methods such as ion-plating, coating and chemical vapor deposition are suitably adapted.

There is no particular restriction in the favor of substrates to be used in the present invention, and the forms of the substrate to be used may vary depending on the purpose of use, etc. Generally, substrates of plate-form, sheet-form or film form are preferably used in the present invention, and it is particularly preferable to use film form substrates to take advantage of their fitness to continuous production systems.

The thickness and identity of the substrates may be selected according to the qualities desired in the substrates such as the degree of transparency, flexibility, strength, processability, and the end use of the device, etc.

The polymer stabilized liquid crystal layer includes a polymer is preferably a nematic liquid crystal matrix. The polymer stabilized liquid crystal layer is formed in such a way as to create different tilts in the liquid crystal configuration in the transmissive and reflective pixels. That is, the monomer precursor is polymerized under different applied voltages in the respective pixels such that the liquid crystal molecules are more or less aligned with the substrates, and thus can produce larger or smaller retardation effects on light passing therethrough.

In order to obtain two polymer stabilized liquid crystal configurations which give proper birefringences for the transmissive and reflective pixels, we polymerized cells in various electric fields. At zero voltage, the liquid crystal oriented parallel to the cell surface along the rubbing direction of the alignment layer. When a voltage above the threshold was applied to cell, the liquid crystal was tilted toward the normal direction of the cell. The higher the applied voltage, the more the liquid crystal was tilted toward the normal direction. The polymer network formed in the liquid crystal was anisotropic and oriented along the liquid crystal direction during the polymerization and remained in that orientation after polymerization if the concentration of the polymer was sufficiently high. After polymerization, the liquid crystal oriented along the polymer network. Therefore higher applied voltage during the polymerization resulted in lower birefringence of the polymer stabilized state.

Thus, in order to create two different polymer stabilized liquid crystal configurations, polymerization of the polymer in the transmissive and reflective pixels may be conducted at different voltages. Thus, in the transmissive pixels, a low field may be applied such that the formed polymer network stabilized a state in which the liquid crystal is tilted only slightly away from the substrate and thus can produce a large retardation effect. Likewise, in the reflective pixels, a high field may be applied such that the formed polymer network stabilizes a state in which the liquid crystal is more tilted away from the substrate and thus produces a small retardation effect. The retardation effect in the transmissive pixels is preferably about twice as much as that in the reflective pixels in a single path. Thus, because the distance light travels in the reflective pixels is twice that of the transmissive pixels because the ambient light passes through the liquid crystal layer twice (due to the reflection and retransmission of the incident light), the net retardation effects on the light in the two modes is preferably the same and therefore the operation of the modes may be synchronized.

In a preferred embodiment, the two polarizers are substantially parallel to each other and the alignment direction of the liquid crystal is 45° with respect to the polarizers. For the transmissive mode, at a low voltage, the retardation angle is about 180°, and the polarization of light is rotated about 90°, resulting in low transmittance. As the applied voltage is increased, the effective birefringence and the retardation angle decrease toward zero and the polarization of the light coming out of the liquid crystal becomes more parallel to the upper polarizer and thus the transmittance increased. For the reflective mode, at low voltage, the retardation angle is preferably about 90°. The incident linearly polarized light is changed into circularly polarized light when it propagates through the liquid crystal for the first time, and its handedness is reversed when reflected by the patterned mirror 228. After the light propagates through the liquid crystal again, it is changed into linearly polarized but perpendicular to the upper polarizer, and therefore reflectance is low. As the applied voltage is increased, the effective birefringence and the retardation angle decrease toward zero, and thus the reflectance increased.

Figure 3:
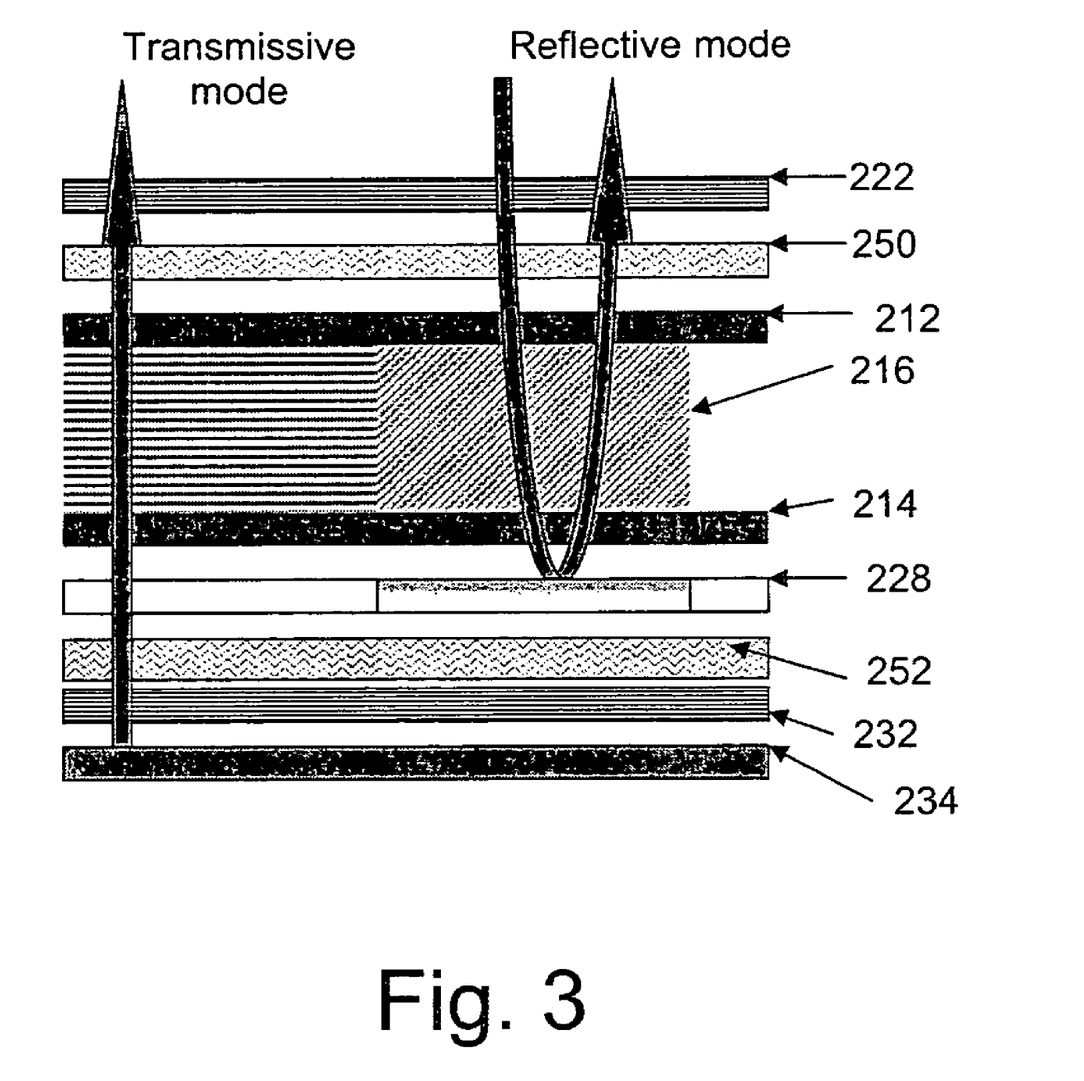
FIG. 3 is a cross-sectional view of a transflective LCD according to a second embodiment.

In a second embodiment, shown in FIG. 3, there is provided a transflective display including upper and lower substrates 212, 214 coated with indium tin oxide (ITO) or some other conducting material to form an electrode. A polymer stabilized liquid crystal layer 216 is interposed between the two substrates. The substrates may be glass or any other suitable material. An upper polarizer 222 is formed on the top surface of the upper substrate and perpendicular to a lower polarizer 232.

A patterned mirror electrode 228 is formed on the lower substrate 214. The patterned mirror 228 is reflective in the region of reflective pixels and transparent in the region of the transmissive pixels. These transparent regions may be thought of as transmitting holes for radiation emitted by a backlight 234. Upper and lower compensation films, 250 and 252, which may be uniaxial birefringence films and having birefringences $(\Delta nd)_1$ and $(\Delta nd)_2$, respectively, are positioned adjacent the upper and lower polarizers. In a preferred embodiment, the principal axis of first compensation film 250 is 45° with respect to upper polarizer 222 and principal axis of second compensation film is −45° with respect to lower polarizer 232.

In a preferred embodiment, the birefringences of the compensation films are chosen in such a way that when the retardation of the liquid crystal at a high voltage is low, the polarization of the light is rotated about 0° in the transmissive mode and about 90° in the reflective mode by the compensation films, resulting in a dark state.

At low voltages, the retardation of the liquid crystal layer in the transmissive mode is about 180° with the polarization of the light rotated about 90° when passing through the compensation films and the liquid crystal layer. The polarization of the reflected light passing out of the device is the same or very close to that of the incident light, resulting in a bright state.

The polymer stabilized ECB transreflective display can be manufactured in the following way. Homogeneous display cells made from two parallel glass plates with ITO coating may used. The substrates are coated with polyimide and buffed for anti-parallel alignment. A mixture of liquid crystal, monomer and photo-initiator is placed in a display cell between the plates. After the display cell is filled with the material, the monomer is polymerized. An electric field is applied across the liquid crystal layer during the polymerization. Specifically, after the mixture of liquid crystal and monomer is filled into the liquid crystal display panel, one type of pixels (such as the transmissive pixels) is cured under UV irradiation (or by other means) with a voltage applied across them and the other type of pixels (such as the reflective pixels) is blocked by a photo-mask. Then the other type of pixels is cured under UV irradiation with a different voltage applied across them and the photo-mask is moved over the pixels cured already or the photo-mask is removed.

Alternatively, and instead of using a photomask, UV radiation can be applied to the backside (i.e. underside) of the display cell under the application of a first voltage. The transmissive pixels will be cured by the application of the radiation, while the reflective pixels will not be due to the radiation being blocked by the patterned mirror. UV radiation is then applied to the frontside (i.e. topside) of the cell along with a second voltage. This application of radiation will cure the reflective pixels. Other methods of manufacturing the present displays are possible.

EXAMPLES

A mixture of nematic liquid crystal ZLI-4469-100 96.7 wt % (available from Merck), a mesogenic diacrylate monomer 3 wt % (lab. made) and photo-initiator benzyl methyl ether 0.3 wt % (available from Polyscience). The mixture was filled into cells consisting of two parallel glass plates with the cell gap of 5 micron. The cells had homogeneous alignment layers. The cells were irradiated under UV light to polymerize the monomer at various voltages. At zero voltage, the liquid crystal oriented parallel to the cell surface along the rubbing direction of the alignment layer. When a voltage above zero was applied to cell, the liquid crystal was tilted toward the normal direction of the cell. The higher the applied voltage, the more the liquid crystal was tilted toward the normal direction. The polymer network formed favored the state in which the polymerization took place.

Figure 4:
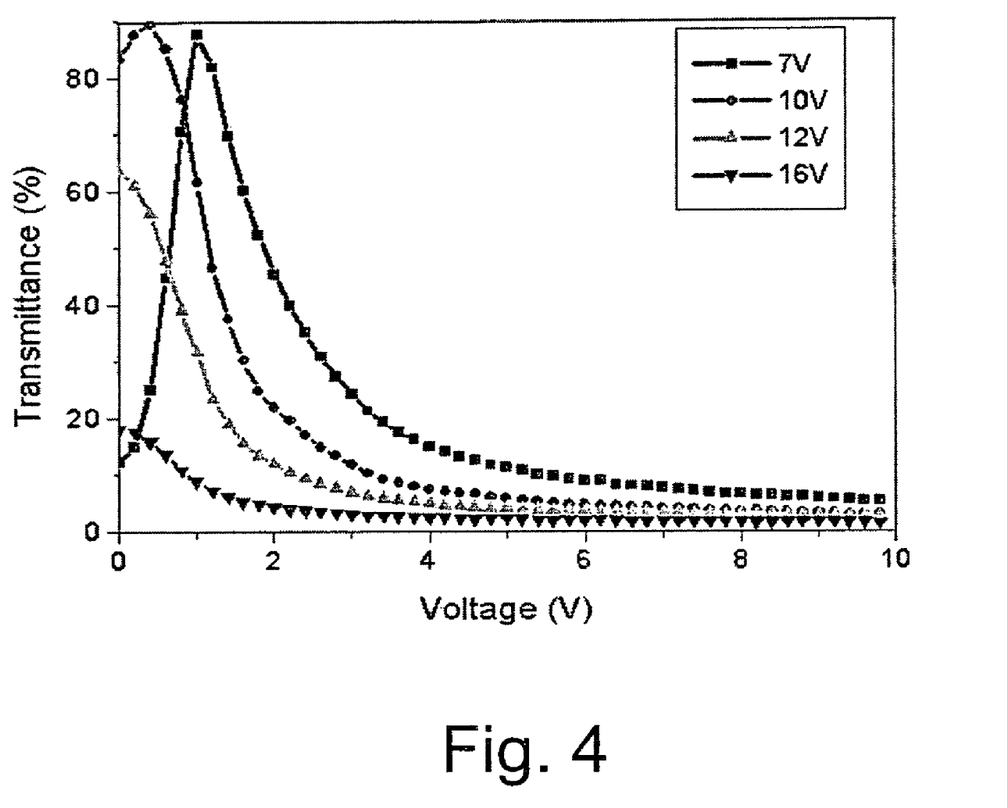
FIG. 4 is a voltage transmittance curve of present embodiment cells as a function of curing voltage.
Figure 5:
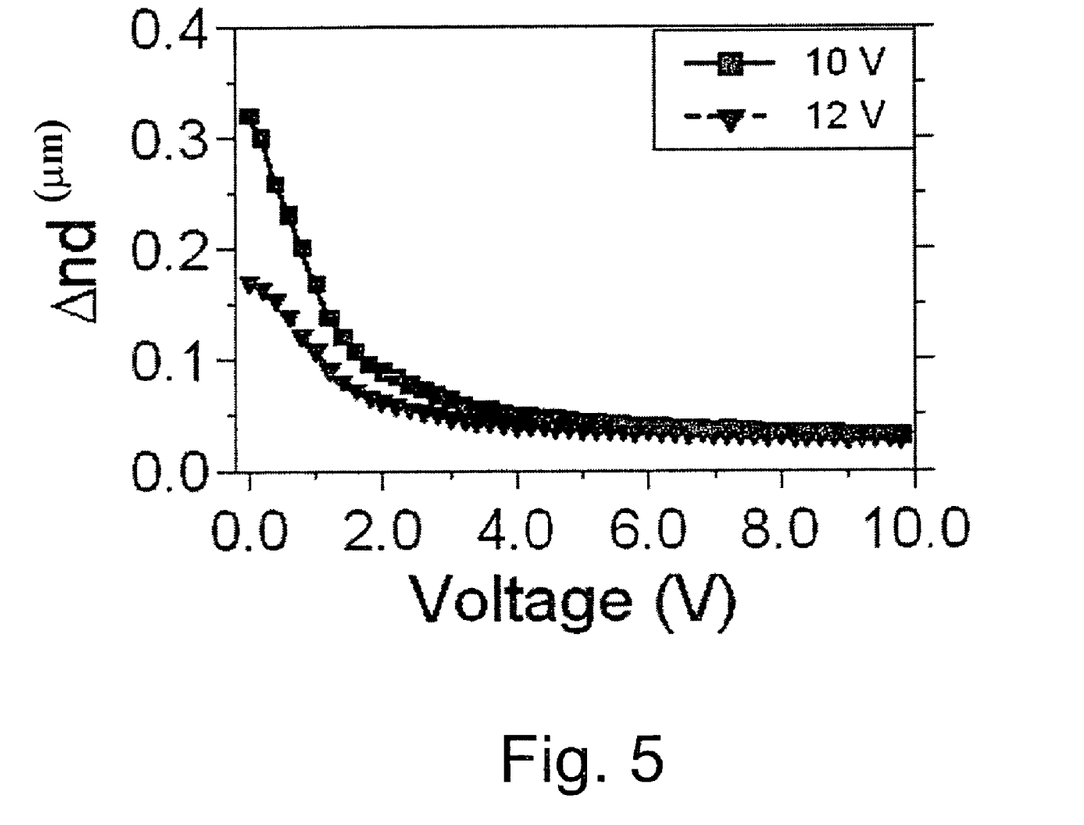
FIG. 5 is a graph showing the retardation of materials made according to the present embodiments after curing as a function of the applied voltage.

After curing, the electro-optical properties of the cells were measured using a He—Ne laser with the wavelength 543.5 nm. In the measurement, the cell was placed between two crossed polarizers and the alignment direction of the alignment layers made 45° with respect to the polarizers. The transmittance of a cell is governed by the equation $$r=\sin^2(\Delta\phi/2) \quad (1)$$

Where $\Delta\phi$ is the retardation angle difference between ordinary and extraordinary light rays. The voltage transmittance curve of the cells as a function of curing voltage is shown in FIG. 4. The retardation of the materials after curing as a function of the applied voltage are shown in FIG. 5. The material cured at 10V has a higher birefringence than the material cured 12V. We chose the material cured at 10V for the transmissive pixel and the material cured at 12V for the reflective pixel.

Figure 6:
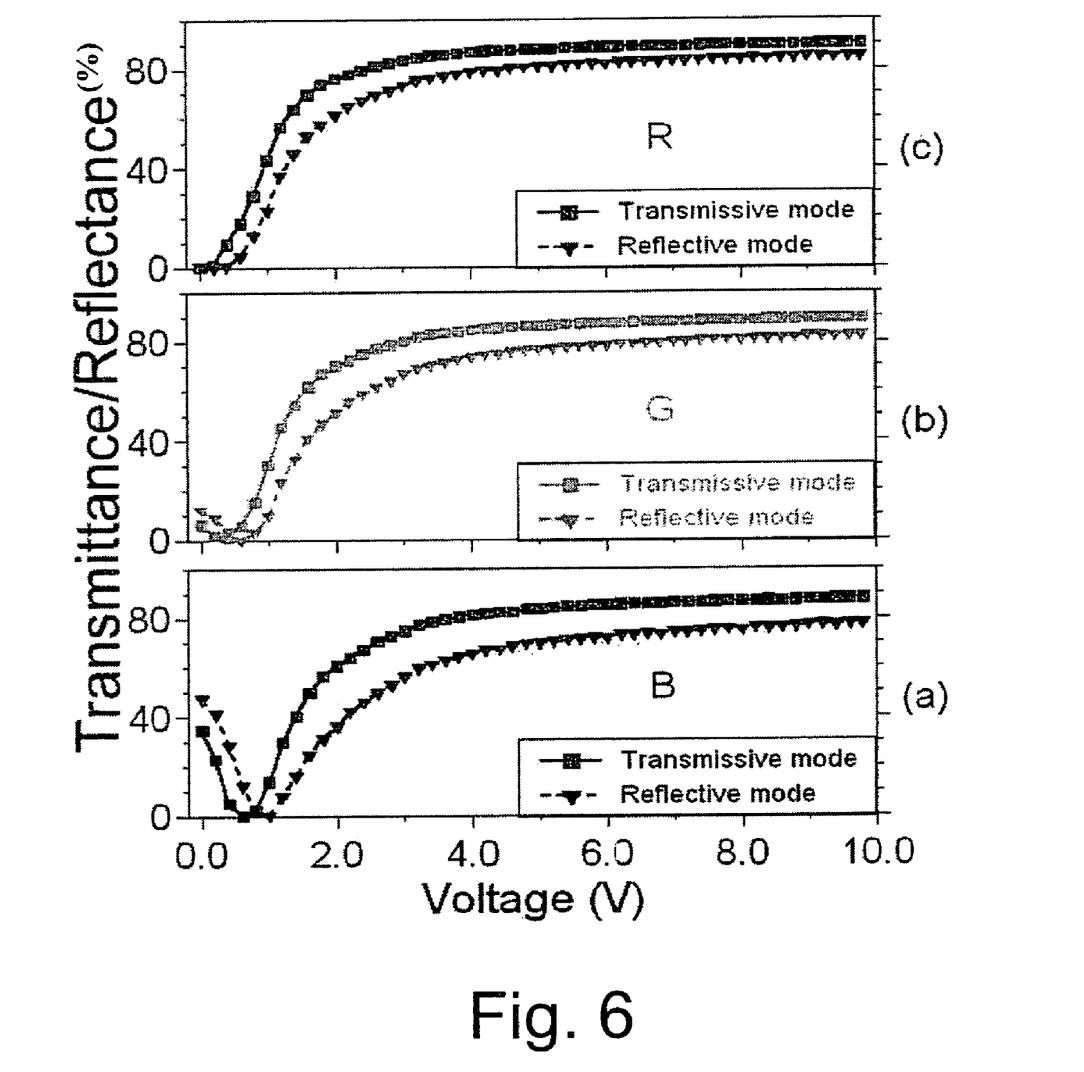
FIG. 6 are graphs of the calculated transmittance of the transmissive mode and the reflectance of the reflective mode as a function of applied voltage in one embodiment.

The two materials were used in a transflective display according to FIG. 2. The two polarizers were parallel to each other and the alignment direction of the liquid crystal was 45° with respect to the polarizers. The calculated transmittance of the transmissive mode and the reflectance of the reflective mode as a function of applied voltage are shown in FIG. 6 (*a*) for blue light at wavelength of 450 nm, (b) for green light at a wavelength of 550 nm, and (c) for red light at a wavelength of 650 nm.

For the transmissive mode, at a low voltage, the retardation angle was about 180°, and the polarization of light was rotated about 90° and thus the transmittance was low. As the applied voltage was increased, the effective birefringence and the retardation angle decreased toward zero and the polarization of the light coming out of the liquid crystal became more parallel to the upper polarizer and thus the transmittance increased. For the reflective mode, at the low voltage, the retardation angle was about 90°. The incident linearly polarized light was changed into circularly polarized light when it propagated through the liquid crystal for the first time, and its handedness was reversed when reflected by the mirror. After the light propagated through the liquid crystal again, it was changed into linearly polarized but perpendicular to the upper polarizer, and therefore reflectance was low.

As the applied voltage was increased, the effective birefringence and the retardation angle decreased toward zero, and thus the reflectance increases. Based on the experimental results, the calculated transmittance-voltage curve of the transmissive pixel and the reflectance-voltage curve of the reflective pixel are shown in FIG. 6. In this design, although both the reflectance and transmittance increased with increasing voltage, there was still some difference between their voltage-dependence.

In a second trial, the two materials were used in a transflective display according to FIG. 3. The two polarizers were perpendicular to each other. The principal axis of the first compensation film was 45° to the upper polarizer. The principal axis of the second compensation film and the liquid crystal alignment direction were parallel and was −45° with respect to the upper polarizer.

Figure 7:
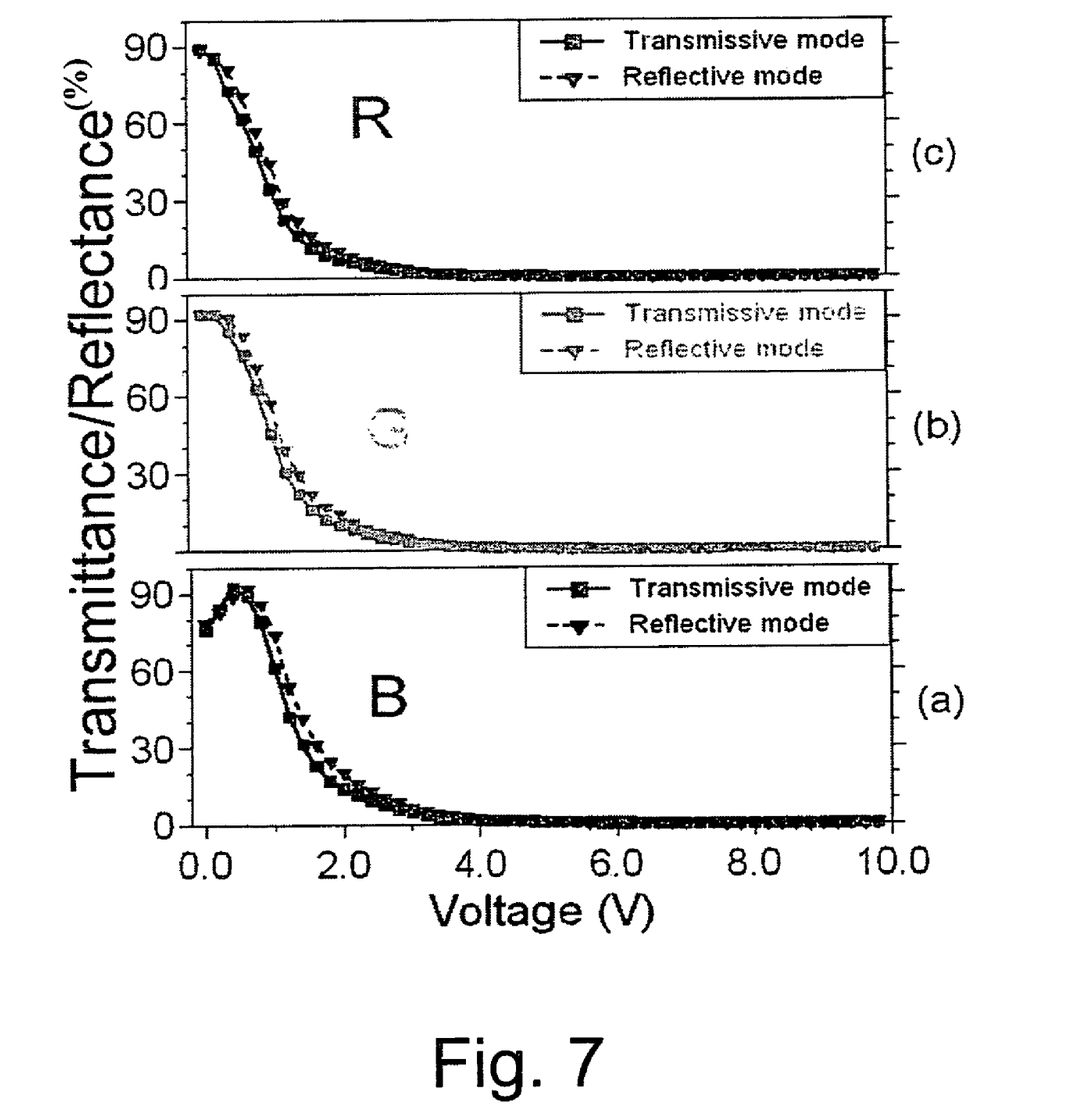
FIG. 7 are graphs of the calculated transmittance of the transmissive mode and the reflectance of the reflective mode as a function of applied voltage in another embodiment.

The birefringences of the compensation films were chosen in such a way that when the retardation of the liquid crystal at a high voltage was low, the polarization of the light was rotated about 0° in the transmissive mode and about 90° in the reflective mode by the compensation films and a dark state was obtained. In this design, the material cured at 10 V was also chosen for the transmissive pixel and the material cured at 12 V was chosen for the reflective pixel. Through optimization it was found that when the birefringence of the first compensation film was 0.140 μm and the birefringence of the second compensation film was 0.108 μm, good performance for both reflective and transmissive pixels was achieved. The voltage-transmittance curve of the transmissive mode and the voltage-reflectance curve of the reflective mode are shown in FIG. 7 (a) for blue light at wavelength of 450 nm, (b) for green light at a wavelength of 550 nm, and (c) for red light at a wavelength of 650 nm. The voltage-dependence of the two modes was almost identical.

We developed a polymer stabilized ECB trans-reflective display in which the transmissive and reflective modes have the same voltage-light intensity dependence. The two modes can be operated simultaneously to achieve high brightness. Furthermore only one TFT is needed to drive one transmissive sub-pixel and one reflective sub-pixel. The same idea can be used to make polymer stabilized pi-cell trans-reflective displays.

This display has the feature that the transmissive and reflective modes have the same voltage-intensity dependence. Therefore only one TFT is needed to drive one transmissive pixel and one reflective pixel, or to drive one pixel in which one half is operated in transmissive mode and the other half is operated in reflective mode.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for creating a polymer stabilized liquid crystal display, including the steps of: a) providing a display cell comprising first and second substrates and a plurality of transmissive and reflective pixels; b) filling said display cell with a mixture of liquid crystal, monomer and, optionally, a polymerization initiator; c) subsequently, curing the monomer in one of said transmissive or reflective pixels concurrently with the application of a first applied voltage across said pixels while the monomer in the other of said transmissive or reflective pixels is prevented from curing; and d) curing the monomer in the other of said transmissive or reflective pixels with the application of a second applied voltage of different magnitude from said first voltage.

2. A method for creating a polymer stabilized liquid crystal display according to claim 1, wherein the substrates are coated with a polyimide layer.

3. A method for creating a polymer stabilized liquid crystal display according to claim 1, wherein the substrates are coated with polyimide and buffed for parallel alignment.

4. A method for creating a polymer stabilized liquid crystal display according to claim 1, wherein said substrates are coated with an indium tin oxide coating to form first and second electrodes.

5. A method for creating a polymer stabilized liquid crystal display according to claim 1, wherein said monomer is UV curable and wherein steps c and d are performed by subjecting said pixels to UV radiation.

6. A method for creating a polymer stabilized liquid crystal display according to claim 5, wherein said monomer in said transmissive or reflective pixels is prevented from curing in step c) by the use of a photo-mask.

7. A method for creating a polymer stabilized liquid crystal display according to claim 1, wherein said first and second applied voltages are such that said liquid crystal in said reflective pixels and said liquid crystal in said transmissive pixels are stabilized in different configurations having different birefrigences.

8. A method for creating a polymer stabilized liquid crystal display according to claim 1, wherein the thickness of the mixture in the transmissive and reflective pixels is substantially the same.

9. A method for creating a polymer stabilized liquid crystal display according to claim 1, wherein the first and second applied voltages are such that light retardation per unit distance in the transmissive pixels is approximately equal to twice the light retardation per unit distance in the reflective pixels in the polymer stabilized liquid crystal display.

10. A method for creating a polymer stabilized liquid crystal display according to claim 1, further comprising disposing a patterned mirror adjacent one of said first and second substrates, said mirror being reflective in the region of said reflective pixels and transparent in the region of the transmissive pixels.

11. A method for creating a polymer stabilized liquid crystal display according to claim 1, wherein step (d) results in a polymer stabilized liquid crystal layer of substantially uniform thickness throughout the display.

12. A method for creating a polymer stabilized liquid crystal display according to claim 11, wherein a liquid crystal in said polymer stabilized liquid crystal layer comprises a nematic liquid crystal.

13. A method for creating a polymer stabilized liquid crystal display according to claim 12, wherein said liquid crystal comprises a benzylideneaniline.

14. A method for creating a polymer stabilized liquid crystal display according to claim 11, wherein a polymer in said polymer stabilized liquid crystal layer comprises a poly (meth)acrylate.

15. A method for creating a polymer stabilized liquid crystal display according to claim 11, wherein said polymer stabilized liquid crystal layer comprises from about 0.5 to 30% by weight polymer.

* * * * *